(12) United States Patent
Saito et al.

(10) Patent No.: US 12,522,777 B2
(45) Date of Patent: Jan. 13, 2026

(54) SLIDING MATERIAL AND GAS COMPRESSOR

(71) Applicant: Hitachi Industrial Equipment Systems Co., Ltd., Tokyo (JP)

(72) Inventors: Hayate Saito, Tokyo (JP); Yoshio Kobayashi, Tokyo (JP); Satoshi Ishii, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 18/843,882

(22) PCT Filed: Oct. 27, 2022

(86) PCT No.: PCT/JP2022/040167
§ 371 (c)(1),
(2) Date: Sep. 4, 2024

(87) PCT Pub. No.: WO2023/228435
PCT Pub. Date: Nov. 30, 2023

(65) Prior Publication Data
US 2025/0179387 A1 Jun. 5, 2025

(30) Foreign Application Priority Data
May 23, 2022 (JP) .................................. 2022-083905

(51) Int. Cl.
*C10M 107/38* (2006.01)
*C10M 125/04* (2006.01)
(Continued)

(52) U.S. Cl.
CPC ........ *C10M 107/38* (2013.01); *C10M 125/04* (2013.01); *C10M 125/02* (2013.01);
(Continued)

(58) Field of Classification Search
CPC .......... C10N 2020/063; C10N 2010/02; C10N 2010/06; C10N 2040/30; C10M 107/38;
(Continued)

(56) References Cited

U.S. PATENT DOCUMENTS

| | | |
|---|---|---|
| 5,604,285 A | 2/1997 | Miyamori et al. |
| 2020/0165444 A1 | 5/2020 | Tachikawa |

FOREIGN PATENT DOCUMENTS

| | | |
|---|---|---|
| JP | S59-223735 A | 12/1984 |
| JP | H05-320455 A | 12/1993 |

(Continued)

OTHER PUBLICATIONS

International Search Report and English Translation, PCT/JP2022/040167, Jan. 17, 2023.

(Continued)

*Primary Examiner* — Vishal V Vasisth
(74) *Attorney, Agent, or Firm* — Volpe Koenig

(57) ABSTRACT

A sliding material includes a resin, first particles disposed in the resin and composed of an inorganic material, and second particles disposed in the resin and composed of an inorganic material whose Vickers hardness is higher than a Vickers hardness of the first particles. When a value obtained by dividing a Vickers hardness of the second particles by the Vickers hardness of the first particles is defined as a hardness ratio and when a value obtained by dividing a contained amount of the first particles with respect to the resin by a contained amount of the second particles with respect to the resin is defined as a content ratio, a value obtained by dividing the hardness ratio by the content ratio is greater than or equal to 0.3 and less than or equal to 2.8.

14 Claims, 6 Drawing Sheets

(51) Int. Cl.
*C10M 125/02* (2006.01)
*C10M 125/22* (2006.01)
*C10N 10/02* (2006.01)
*C10N 10/06* (2006.01)
*C10N 20/00* (2006.01)
*C10N 40/30* (2006.01)

(52) U.S. Cl.
CPC ..... *C10M 125/22* (2013.01); *C10M 2201/041* (2013.01); *C10M 2201/05* (2013.01); *C10M 2201/066* (2013.01); *C10M 2213/023* (2013.01); *C10N 2010/02* (2013.01); *C10N 2010/06* (2013.01); *C10N 2020/063* (2020.05); *C10N 2040/30* (2013.01)

(58) Field of Classification Search
CPC  C10M 125/02; C10M 125/04; C10M 125/22; C10M 2201/041; C10M 2201/05; C10M 2201/066; C10M 2213/023
See application file for complete search history.

(56) References Cited

FOREIGN PATENT DOCUMENTS

| | | |
|---|---|---|
| JP | 2001-131372 A | 5/2001 |
| JP | 2002-276665 A | 9/2002 |
| JP | 2003-056566 A | 2/2003 |
| JP | 2004-277610 A | 10/2004 |
| JP | 2005-036198 A | 2/2005 |
| JP | 2008-014454 A | 1/2008 |
| JP | 2011179392 A * | 9/2011 |
| JP | 2015-071793 A | 4/2015 |
| WO | 2018/230195 A1 | 12/2018 |

OTHER PUBLICATIONS

Written Opinion and Machine Translation, PCT/JP2022/040167, Jan. 17, 2023.

* cited by examiner

SLIDING MATERIAL AND GAS COMPRESSOR

CROSS-STATEMENT STATEMENT

This application is US National Stage of International Patent Application PCT/JP2022/040167, filed Oct. 27, 2022, which claims benefit of priority from Japanese Patent Application JP2022-083905, filed May 23, 2022, the contents of both of which are incorporated herein by reference.

BACKGROUND

Technical Field

The present invention relates to a sliding material and a gas compressor.

Related Art

Known gas compressors that compress gas such as air includes a reciprocating gas compressor and a scroll gas compressor. In a reciprocating gas compressor, for example, a piston ring is attached to a piston that reciprocates in a metal cylinder. The piston ring acts as a sliding material that slides along an inner surface of the cylinder. In a scroll gas compressor, for example, a tip seal is attached as a sliding material to an edge of a fixed scroll made of metal or an orbiting scroll, which makes contact with and slides along the fixed scroll while making an orbiting motion.

As the sliding material, for example, a resin material such as a polytetrafluoroethylene (PTFE) is used. PTFE, for example, has high crystallinity and low shear strength. Because of this, when PTFE is subjected to a shear force, a surface layer of the PTFE can peel off easily at a micro level and transfer onto a mating surface (sliding surface) such as an inner surface of a cylinder. To improve durability against abrasion of a sliding material whose base material is PTFE, a composite resin material containing metal particles is known.

Patent Literature 1 (Japanese Unexamined Patent Application Publication No. 2015-71793) describes the following in its abstract: "A resin sliding material that is used for machine tools, slides along a metal mating material under oil lubrication, and includes a PTFE resin as a main component is provided. The resin sliding material is blended with a powder of a metal that has a lower standard electrode potential than a material metal of the metal mating material and is other than a copper-aluminium based copper alloy. Alternatively, the resin sliding material is blended further with regenerated PTFE resin powder."

Through studies by inventors of the present disclosure, the sliding material described in Patent Literature 1 has been found to have a problem in terms of wear resistance, details of which will be described later with reference to Examples.

SUMMARY

A sliding material of the present disclosure includes a resin, first particles disposed in the resin and composed of an inorganic material, and second particles disposed in the resin and composed of an inorganic material whose Vickers hardness is higher than a Vickers hardness of the first particles. When a value obtained by dividing a Vickers hardness of the second particles by the Vickers hardness of the first particles is defined as a hardness ratio and when a value obtained by dividing a contained amount of the first particles with respect to the resin by a contained amount of the second particles with respect to the resin is defined as a content ratio, a value obtained by dividing the hardness ratio by the content ratio is greater than or equal to 0.3 and less than or equal to 2.8.

Other means of solving the problem will be described later in the description of embodiments.

DETAILED DESCRIPTION

Figure 1:
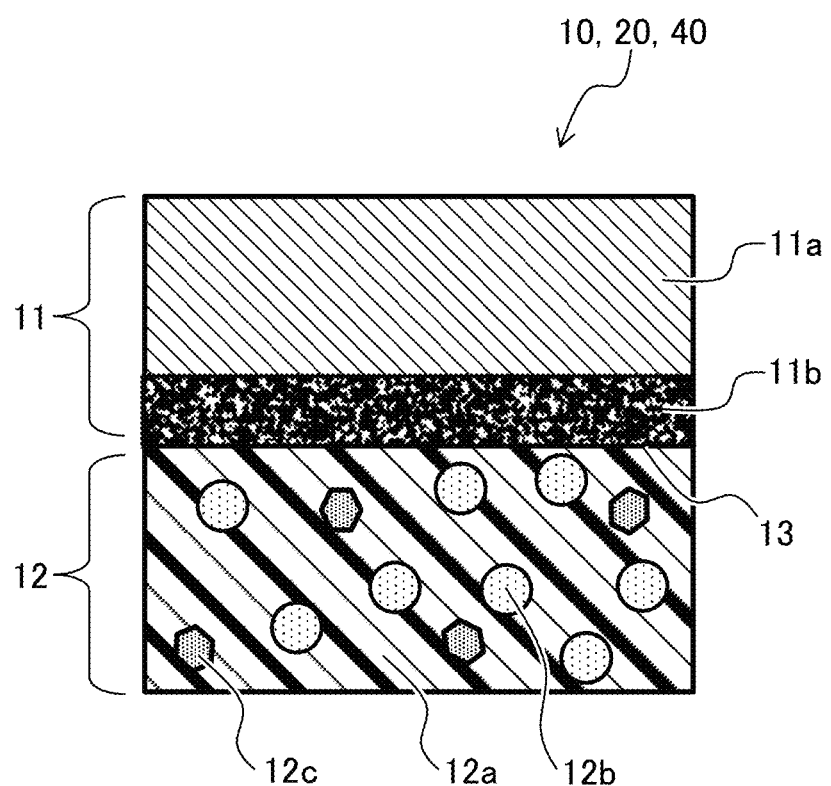
FIG. 1 is an enlarged sectional view showing a sliding portion of a gas compressor according to an embodiment.

Hereinafter, implementations (referred to as embodiments) of the present disclosure will be described with reference to the drawings. In the following description of an embodiment, another embodiment applicable to said embodiment will be described as appropriate. The present disclosure is not limited to the following embodiments. Different embodiments may be combined with each other, or an embodiment may be arbitrarily modified within a range that does not significantly impair the effect of the present disclosure. Members that are the same are denoted by the same reference numeral, and duplicate description is omitted. Further, components having the same function are denoted by the same name. Content shown in the drawings is merely schematic. For convenience of illustration, a configuration may be changed from an actual configuration or some members may be omitted or modified among the drawings within a range that does not significantly impair the effect of the present disclosure.

FIG. 1 shows an enlarged sectional view of a sliding portion 10 of a gas compressor 20, 40 according to an embodiment. The drawing of FIG. 1 corresponds to part A indicated in FIG. 3 and part B indicated in FIG. 5, both of which will be described below. The gas compressor 20 is, for example, a scroll type, and the gas compressor 40 is, for example, a reciprocating type, and details of the gas compressors 20 and 40 will be given below. First, a sliding portion 10 provided in the gas compressors 20 and 40 will be described with reference to FIG. 1.

The sliding portion 10 includes a member 11 made of metal (for example, made of aluminium) and a sliding material 12. When viewed from the member 11, the sliding material 12 slides on the member 11 by, for example, orbiting, reciprocating, or the like. When viewed from the sliding material 12, the member 11 slides on the sliding material 12 by, for example, orbiting, reciprocating, or the like. The sliding material 12 is provided with, for example, a fixed scroll 21 and an orbiting scroll 22 (both shown in FIG. 3) and a piston 42 (shown in FIG. 5), details of which will be described later.

In the sliding portion 10, the sliding material 12 slides by being in contact with the member 11 on a sliding surface 13. Lubricating oil, grease, or the like may be present on the sliding surface 13. However, in the case of gas compressors 20 and 40, the sliding material 12 slides oil free on the sliding surface 13. In such a case, the effect of the present disclosure may be particularly large. Here, oil free refers to a state in which no lubricating oil or the like is present. However, oil free may also refer to a so-called oil-less state in which lubricating oil or the like does not exist sufficiently.

The member 11 includes a metallic material 11a and a surface layer 11b. The metallic material 11a functions, for example, as a base material, and the surface layer 11b is formed on a surface of the metallic material 11a. The sliding surface 13 is formed on a surface of the surface layer 11b, and the sliding material 12 slides while being in contact with the surface layer 11b.

The metallic material 11a is not particularly limited as long as it has strength as a member of the gas compressor 20, 40; for example, a light metal such as aluminium, magnesium, or silicon or a transition metal such as iron, chromium, nickel, molybdenum, titanium, or copper may be used on its own or as a compound or mixture (an alloy, etc.). More specifically, for example, an aluminium-based material such as aluminium or an aluminium alloy, an iron-based material such as iron or an iron-nickel alloy, a titanium-based material such as titanium or a titanium alloy, or a copper-based material such as copper or a copper alloy may be used. Among these, the use of an aluminium-based material may exhibit good wear resistance. The aluminium-based material may contain, for example, a small amount of magnesium, silicon, or the like. The iron-based material may contain, for example, chromium, nickel, molybdenum, or the like.

The surface layer 11b may for example be a natural oxide film that forms naturally on the metallic material 11a or an artificially applied surface coating. In the case of a natural oxide film, when, for example, the metallic material 11a is made of an aluminium-based material, the surface layer 11b is made of aluminium oxide. When the metallic material 11a is made of an iron-based material, the surface layer 11b is made of iron oxide. When the metallic material 11a is made of a copper-based material, the surface layer 11b is made of copper oxide.

In the illustrated example, the surface layer 11b is an anodized aluminium layer made of aluminium oxide, and the sliding surface 13 is a surface of the anodized aluminium layer. By forming the sliding surface 13 in this way, the metallic material 11a may be protected.

When the surface layer 11b is a surface coating, the surface layer 11b may, for example, be formed by plating, physical vapor deposition (PVD), chemical vapor deposition (CVD), or carburizing. In this case, the surface layer 11b is usually made of a material including at least one of aluminium, phosphorus, chromium, iron, nickel, or zinc, for example. Examples of the surface coating including such an element include anodized aluminium, aluminium plating, nickel plating, chromium plating, iron plating, and zinc plating.

In the example shown in FIG. 1, the surface layer 11b is formed on a surface of the metallic material 11a. However, there may not be the surface layer 11b formed on the metallic material 11a, and the metallic material 11a may be exposed on a surface of the member 11. That is, a metallic surface of the member 11 may be formed of a metal constituting the metallic material 11a or may be formed of the surface layer 11b that is formed on the metallic material 11a.

The sliding material 12 includes a resin 12a, first particles 12b, and second particles 12c. The resin 12a serves, for example, as a base material. The resin 12a may be a fluorocarbon polymer. The use of a fluorocarbon polymer may improve durability. Further, a transfer of the fluorocarbon polymer to the sliding surface 13 may be promoted. As the fluorocarbon polymer, for example, at least one of the above-mentioned PTFE, a tetrafluoroethylene-perfluoroalkyl vinyl ether copolymer (PFA), a tetrafluoroethylene-ethylene copolymer (ETFE), or polyvinylidene fluoride (PVDF) may be used. The resin 12a may be a combination of two or more resins of different types. For example, PTFE and a fluorocarbon polymer other than PTFE may be mixed and used together as the resin 12a. The resin 12a may not be a fluorocarbon polymer and may be any other resin.

The first particles 12b are disposed in the resin 12a and are composed of an inorganic material. The first particles 12b may be dispersed in the resin 12a. The first particles 12b may be composed of metal. When the first particles 12b are composed of metal, a Vickers hardness of the first particles 12b may be easily set to a desired value.

The Vickers hardness (HV) of the first particles 12b may be a Vickers hardness of a soft material having ductility. More specifically, the Vickers hardness (HV) of the first particles 12b is, for example, greater than or equal to 50HV with an upper limit of, for example, 200HV. The upper limit may be 100HV. When the Vickers hardness is in this range, the first particles 12b may exhibit ductility during sliding on the sliding surface 13, thus improving wear resistance.

The first particles 12b may be composed of at least one of copper, an alloy whose main component is copper, aluminium, or an alloy whose main component is aluminium. By using these, the wear resistance may be improved. The phrases "main component is copper" and "main component is aluminium" mean that the metal that is most abundant in the alloy is copper and aluminium respectively.

There may be a chemical treatment layer formed between the resin 12a and the first particles 12b. By forming the chemical treatment layer, various functions derived from the chemical treatment layer may be imparted. The chemical treatment layer is formed, for example, on surfaces of the first particles 12b. The chemical treatment layer is, for example, an adhesion layer that improves a joining strength between the resin 12a and the first particles 12b. The adhesion layer may be formed, for example, by a coupling treatment, a plating treatment, or the like. The coupling treatment may be performed using, for example, a titanium-based or silicon-based coupling agent. The plating treatment such as nickel plating or iron plating may be performed using a transition metal having high chemical affinity with the resin 12a.

An average particle size (size) of the first particles 12b is not particularly limited, but may be, for example, greater than or equal to 10 μm, with an upper limit of, for example, 500 μm. The average particle size may be greater than or equal to 50 μm. The upper limit of the average particle size may be 100 μm. The average particle size of the first particles 12b may, for example, be measured using a laser diffraction-type particle size distribution measuring apparatus.

The second particles 12c are disposed in the resin 12a and are composed of an inorganic material. The second particles 12c may be dispersed in the resin 12a. The second particles 12c may be composed of at least one of a metal or a ceramic. By this, a Vickers hardness of the second particles 12c may be easily set to a desired value in relation to the first particles 12b.

The second particles 12c are composed of an inorganic material having a Vickers hardness that is higher than that of the first particles 12b. Examples of such inorganic particles include hard metal particles and ceramic particles such as diatomaceous earth, alumina, silica, titanium oxide, zinc oxide, and silicon carbide. The second particles 12c may include at least one of diatomaceous earth, alumina, silica, titanium oxide, zinc oxide, or silicon carbide. By using these, the Vickers hardness may be made greater than that of the first particles 12b more easily.

An average particle size (size) of the second particles 12c is not particularly limited, but may be, for example, greater than or equal to 10 μm, with an upper limit of, for example, 500 μm. The average particle size may be greater than or equal to 20 μm. The upper limit of the average particle size may be 100 μm. The average particle size of the second particles 12c may be measured, for example, using a laser diffraction-type particle size distribution measuring apparatus.

When a value obtained by dividing a contained amount of the first particles 12b (first particle content) with respect to the resin 12a by a contained amount of the second particles 12c (second particle content) with respect to the resin 12a is defined as a content ratio (hereinafter, referred to as a content ratio of the present disclosure), the content ratio of the present disclosure is not particularly limited. The content ratio of the present disclosure may be greater than or equal to 3, or may be greater than or equal to 6, with an upper limit that may be 40 or may be 20. The content ratio of the present disclosure may be calculated as {contained amount (mass %) of the first particles 12b}/{contained amount (mass %) of the second particles 12c}.

When a value obtained by dividing the Vickers hardness of the second particles 12c by the Vickers hardness of the first particles 12b is defined as a hardness ratio (hereinafter, referred to as a hardness ratio of the present disclosure), the hardness ratio of the present disclosure is not particularly limited. The hardness ratio of the present disclosure may be greater than or equal to 6, or may be greater than or equal to 10, with an upper limit that may be 30 or may be 25. The hardness ratio of the present disclosure may be calculated as {Vickers hardness (HV) of the second particles 12c}/{Vickers hardness (HV) of the first particles 12b}. Further, by using Vickers hardness as an index of hardness, hardness of the first particles 12b and the second particles 12c may be expressed appropriately, and materials of the first particles 12b and the second particles 12c may be selected appropriately based on a value of the present disclosure, which will be described in detail below.

For the sliding material 12 of the present disclosure, a value obtained by dividing the hardness ratio of the present disclosure by the content ratio of the present disclosure (hereinafter referred to as a value of the present disclosure) is greater than or equal to 0.3 and less than or equal to 2.8. Therefore, the hardness ratio of the present disclosure and the content ratio of the present disclosure may be adjusted so that the value of the present disclosure is in this range. By setting the value of the present disclosure within this range, good wear resistance may be exhibited, as will be described in detail below with reference to Examples. The value of the present disclosure may be greater than or equal to 1.1. An upper limit of the value of the present disclosure may be 1.8 or may be 1.6. By setting the value of the present disclosure within this range, a particularly good wear resistance may be exhibited. The value of the present disclosure may be calculated as {hardness ratio (–) of the present disclosure}/{content ratio (–) of the present disclosure}.

A reason why the value of the present disclosure is set to the above range is as follows. The present inventors conducted, for example, a large number of friction tests in accordance with the test method shown in FIG. 7 that is described later. As a result, the present inventors have found that a wear amount of the sliding material 12 correlates with the hardness ratio of the present disclosure and the content ratio of the present disclosure related to the first particles 12b and second particles 12c. In particular, it has been identified that when the hardness ratio of the present disclosure is too large or the content ratio of the present disclosure is too small, the wear amount increases due to an abrasive effect of the first particles 12b and the second particles 12c. Further, it has been revealed that when the hardness ratio of the present disclosure is too small or the content ratio of the present disclosure is too large, the wear amount increases due to reduced durability of the sliding material 12 itself.

On the other hand, when the hardness ratio and the content ratio of the present disclosure are controlled to be in appropriate ranges for the first particles 12b and the second particles 12c, a shear stress during sliding is effectively supported primarily by the relatively hard second particles 12c. In addition, the relatively soft first particles 12b, while supporting shear stress, has an effect of weakening aggression from the hard member 11 through having part of abrasion powder of the first particles 12b adhere to the member 11. These synergistic effects are exhibited when the value of the present disclosure, a parameter that is defined by the hardness ratio of the present disclosure and the content ratio of the present disclosure, is appropriately controlled. Therefore, the value of the present disclosure contributes, for example, to improvement of the wear resistance of the sliding material 12 in a severe environment.

The sliding material 12 may further include fiber. The fiber is disposed in the resin 12a and may be dispersed in the resin 12a. By including the fiber, a mechanical strength of the sliding material 12 may be improved. The fiber, for example, includes at least one of carbon fiber, glass fiber, metal fiber, ceramic fiber, or the like. The fiber may be carbon fiber. When carbon fiber is used as the fiber, both weight reduction and strength improvement of the sliding material 12 may be achieved.

A length and diameter of the fiber are not particularly limited as long as effects of the present disclosure are not significantly impaired. For example, the length may be greater than or equal to 10 μm and less than or equal to 300 μm. For example, the diameter may be greater than or equal to 1 μm and less than or equal to 30 μm. The length and diameter may be measured values from a cross-sectional micrograph of the sliding material 12.

The sliding material 12 may further include a solid lubricant. The solid lubricant may be in the form of particles having, for example, a particle size that is greater than or equal to 10 μm and less than or equal to 500 μm. The particle size may be an average particle size measured using, for example, a laser diffraction-type particle size distribution measuring apparatus.

The solid lubricant is disposed in the resin 12a and may be dispersed in the resin 12a. The solid lubricant may, for example, be at least one of molybdenum disulfide, graphite, boron nitride, or the like. The solid lubricant may be molybdenum disulfide. When molybdenum disulfide is used as the solid lubricant, in addition to improving wear resistance through reducing friction, strength of the sliding material 12 against stress such as shear stress may be improved.

For the sliding material 12, at least the types of the resin 12a, first particles 12b, and second particles 12c thereof may be confirmed as follows. That is, a surface or crushed material of the sliding material 12 for example may be easily analyzed by chemical analysis such as scanning electron microscope, energy dispersive X-ray spectroscopy, infrared spectroscopy, X-ray diffraction, or the like. The hardness of the first particles 12b and second particles 12c may be confirmed through, for example, hardness measurement using a nanoindenter or the like. The contained amount of the first particles 12b (first particle content) and contained amount of the second particles 12c (second particle content) may be easily confirmed by thermogravimetry or the like.

The sliding material 12 may for example be manufactured as follows. That is, powder of the resin 12a, the first particles 12b, the second particles 12c, and, for example, carbon fiber, molybdenum disulfide powder, or the like as appropriate are mixed using a mixer, whereby a uniform mixed powder may be obtained. Then, by molding the mixture into an arbitrary shape by compression molding or injection molding, a molded object may be obtained. Finally, by firing the molded object in an electric furnace or the like, the sliding material 12 may be obtained. The firing may be performed within a temperature range that is appropriately adjusted according to the type of the resin 12a or the like to be used.

Figure 2:
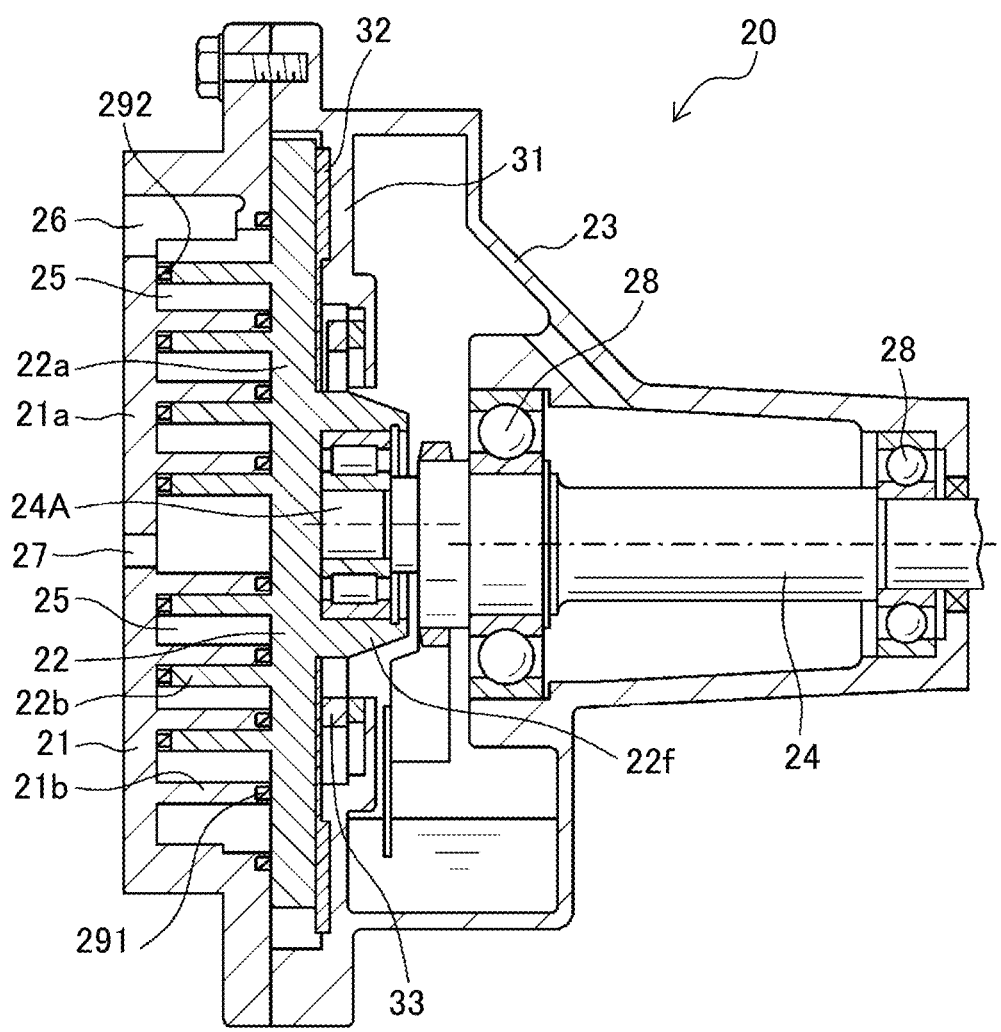
FIG. 2 is a sectional view showing a structure of a gas compressor according to an embodiment.

FIG. 2 is a sectional view showing a structure of the gas compressor 20 of an embodiment. In the example of FIG. 2, the gas compressor 20 is a scroll gas compressor. The gas compressor 20 includes a casing 23 forming an outer shell of the gas compressor 20, a drive shaft 24 rotatably provided in the casing 23, a fixed scroll 21 attached to the casing 23, and an orbiting scroll 22 provided on a crankshaft 24A of the drive shaft 24 so that the orbiting scroll 22 is able to orbit.

The fixed scroll 21 includes a fixed end plate 21a and a fixed scroll wrap 21b formed in a spiral shape on a main surface side of the fixed end plate 21a. The orbiting scroll 22 includes an orbiting end plate 22a and an orbiting scroll wrap 22a formed in a spiral shape on a main surface side of the orbiting end plate 22a. A boss part 22f is protrusively provided at the center of a back surface side of the orbiting end plate 22a of the orbiting scroll 22.

The orbiting scroll 22 is arranged facing the fixed scroll 21 so that the orbiting scroll wrap 22b and the fixed scroll wrap 21b intermesh. In this way, a compression/expansion chamber 25 is formed between the fixed scroll wrap 21b and the orbiting scroll wrap 22b. The compression/expansion chamber 25 is provided in the gas compressor 20 and performs at least one of compression or expansion of gas. In the illustrated example, gas that flows into the compression/expansion chamber 25 is compressed.

An inlet 26 is formed on a periphery of the fixed end plate 21a of the fixed scroll 21. The inlet 26 communicates with the compression/expansion chamber 25 on an outermost circumference. An outlet 27 is formed at a central part of the fixed end plate 21a of the fixed scroll 21. The outlet 27 opens to the compression/expansion chamber 25 on an innermost circumference.

The drive shaft 24 is rotatably supported by the casing 23 via a ball bearing 28. One end of the drive shaft 24 is connected to an electric motor (not shown) or the like outside the casing 23, and another end of the drive shaft 24 extends in the casing 23 to serve as a crankshaft 24A. The crankshaft 24A has an axis that is eccentric from an axis of the drive shaft 24 by a predetermined amount.

A thrust receiving part 31 that is annular is provided on an inner circumference of the casing 23 on the orbiting scroll 22 side. A thrust plate 32 is provided between the thrust receiving part 31 and the orbiting end plate 22a. The thrust plate 32 is formed as an annular plate body that is made of, for example, a metal material such as iron. A surface thereof slides with respect to the orbiting end plate 22a when the orbiting scroll 22 performs an orbiting motion. Thus, together with the thrust receiving part 31, the thrust plate 32 receives a load in a thrust direction (a direction in which the orbiting scroll 22 separates from the fixed scroll 21) that acts on the orbiting scroll 22 mainly during a compression operation. In this way, galling and abnormal wear between the casing 23 and the orbiting end plate 22a are suppressed.

Further, an Oldham's ring 33 is provided between the thrust receiving part 31 and the orbiting end plate 22a at a position closer to the center than the thrust plate 32. The Oldham's ring 33 prevents the orbiting scroll 22 from rotating when the orbiting scroll 22 is rotationally driven by the drive shaft 24 and provides a circular motion having an orbit radius of a predetermined size by the crankshaft 24A.

When the drive shaft 24 is rotated by an electric motor or the like (not shown), the orbiting scroll 22 orbits with an orbit radius of a predetermined size and external air sucked in from the inlet 26 is sequentially compressed in the compression/expansion chamber 25. The compressed air is discharged from the outlet 27 of the fixed scroll 21 to an external air tank or the like.

Figure 3:
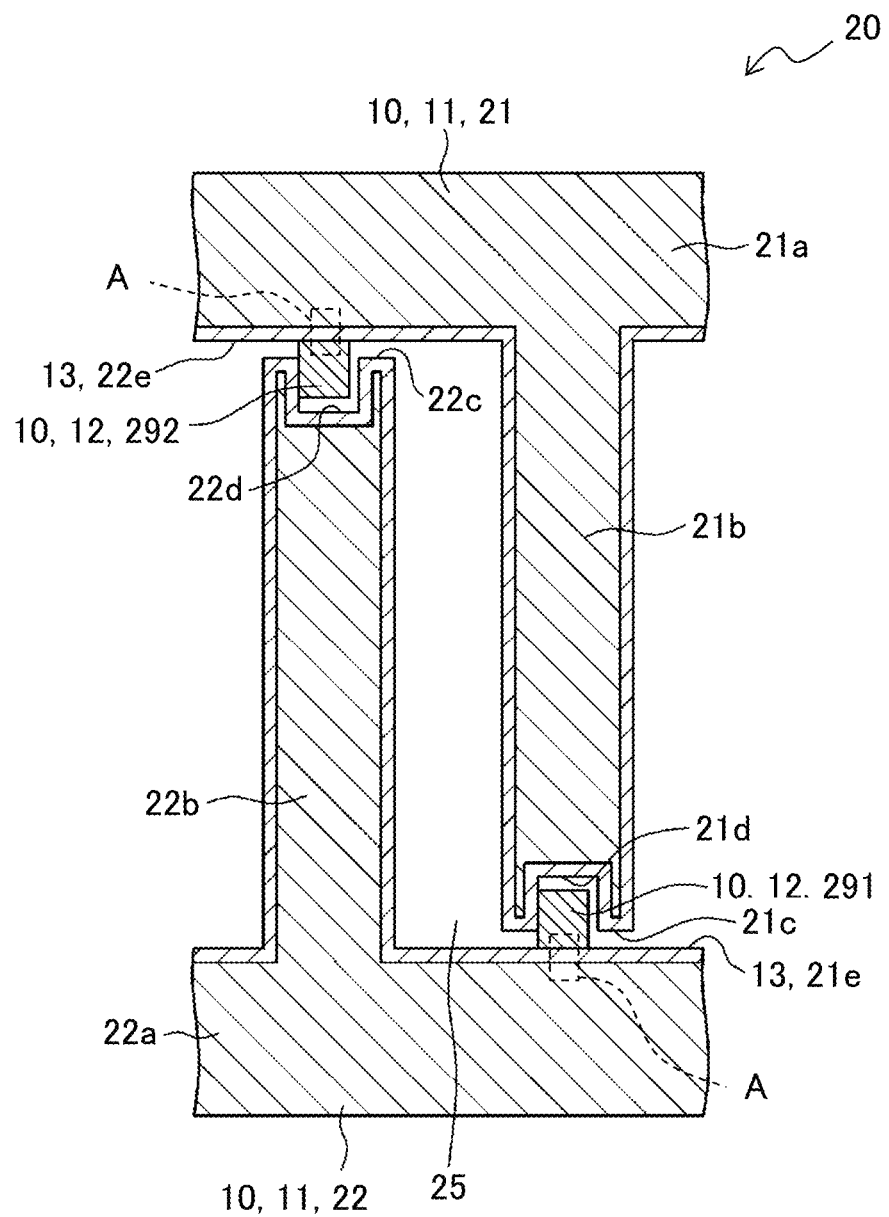
FIG. 3 is an enlarged view of a part of a fixed scroll and an orbiting scroll of the gas compressor shown in FIG. 2.

FIG. 3 shows an enlarged view of a part of the fixed scroll 21 and the orbiting scroll 22 of the gas compressor 20 of FIG. 2. The fixed scroll 21 and the orbiting scroll 22 are examples of the member 11 shown in FIG. 1. Tip seals 291 and 292 are examples of the sliding material 12 shown in FIG. 1. Therefore, the sliding portion 10 includes the fixed scroll 21 or the orbiting scroll 22 and the tip seal 291 or 292.

An end face 21c of the fixed scroll wrap 21b faces the orbiting end plate 22a. A groove 21d is formed on the end face 21c, and a tip seal 291 is fitted in the groove 21d. Further, an end face 22c of the orbiting scroll wrap 22b faces the fixed end plate 21a. A groove 22d is formed on the end face 22c, and the tip seal 292 is also fitted in the groove 22d.

The tip seals 291 and 292 slide on wrap bottom faces 21e and 22e that define the compression/expansion chamber 25. The wrap bottom faces 21e and 22e are examples of the sliding surface 13 shown in FIG. 1. The fixed scroll 21 and the orbiting scroll 22 are, for example, made of an aluminium-based material such as aluminium or an aluminium alloy. Surfaces of the fixed scroll 21 and the orbiting scroll 22 are anodized. Therefore, the wrap bottom faces 21e and 22e are surfaces of an anodized aluminium layer.

With the orbiting motion of the orbiting scroll 22, the tip seal 291 slides on the wrap bottom face 22e of the orbiting end plate 22a and the tip seal 292 slides on the wrap bottom face 21e of the fixed end plate 21a. Accordingly, it is possible to suppress contact between the fixed scroll wrap 21b and the wrap bottom face 22e of the orbiting end plate 22a and to suppress contact between the orbiting scroll wrap 22b and the wrap bottom face 21e of the fixed end plate 21a. As a result, a smoothly slidable state may be obtained.

A surface of the thrust plate 32 or a surface of the orbiting end plate 22a that forms the sliding surface of a sliding part between the thrust plate 32 (FIG. 2) and the orbiting end plate 22a may be coated with the sliding material 12. In the above description, an example has been provided where the thrust plate 32 is formed of a metal material such as iron, but the thrust plate 32 itself may be formed of the sliding material 12.

In the above description, a mechanism for suppressing the rotation of the orbiting scroll 22 by the thrust plate 32 and the Oldham ring 33 provided at a position closer to the center than the thrust plate 32 has been described. However, the scroll gas compressor 20 is not limited thereto, and the present disclosure may be applied to a scroll gas compressor that uses another mechanism for rotation prevention such as an auxiliary crank or an Oldham coupling (neither of which is shown).

Figure 4:
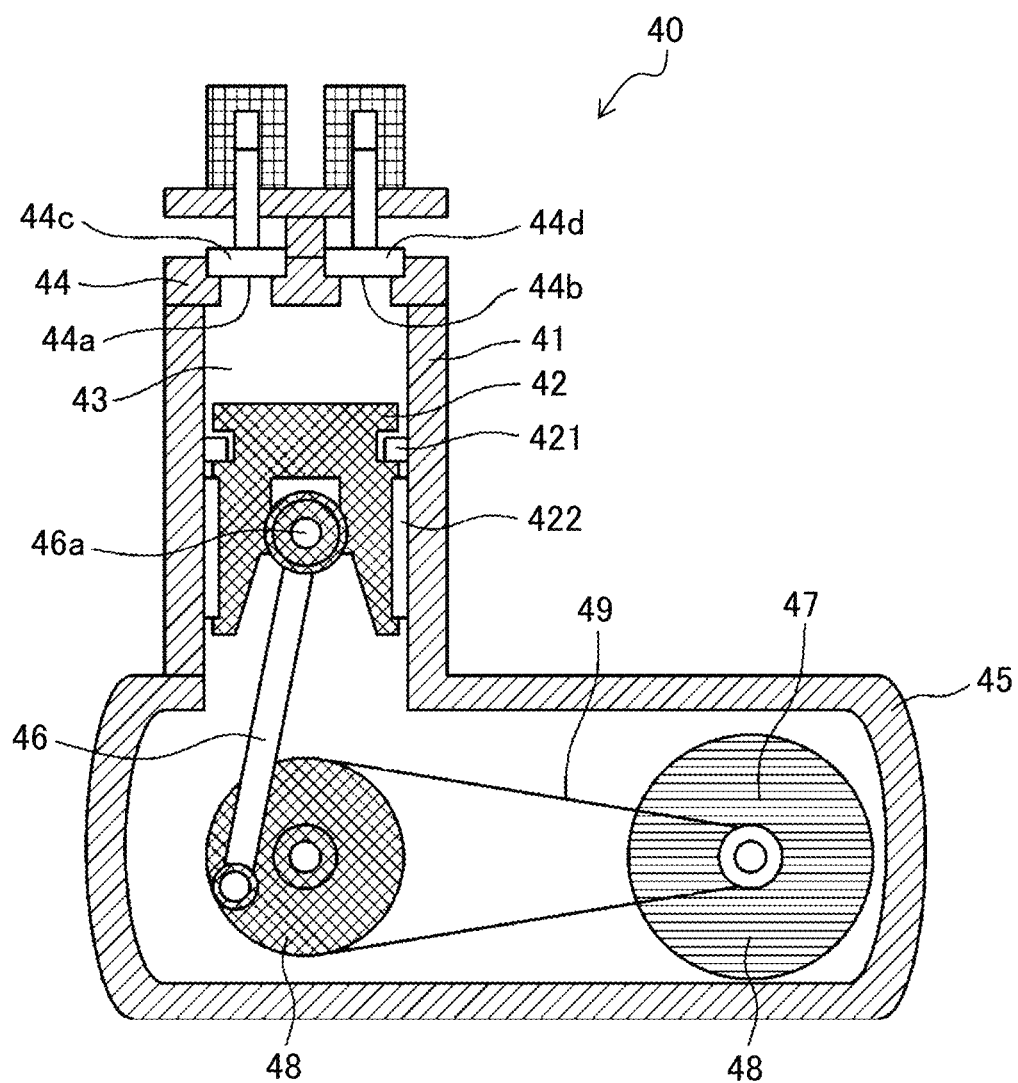
FIG. 4 is a sectional view showing a structure of a gas compressor according to another embodiment.

FIG. 4 is a sectional view showing a structure of a gas compressor 40 according to another embodiment. In the example shown in FIG. 4, the gas compressor 40 is a reciprocating gas compressor. The gas compressor 40 includes a cylinder 41 and a piston 42 that reciprocates inside the cylinder 41. A compression/expansion chamber 43 is formed in a space defined by the piston 42 in the cylinder 41. The compression/expansion chamber 43 is an example of a chamber that performs at least one of compression or expansion of a gas. In the illustrated example, the gas that flows into the compression/expansion chamber 43 is compressed.

The upper end of the cylinder 41 is closed by a partition plate 44. The partition plate 44 is provided with an inlet 44a and outlet 44b. The inlet 44a and outlet 44b are provided with an inlet valve 44c and an outlet valve 44d respectively, and the inlet valve 44c and the outlet valve 44d each lead to a pipe (not shown).

The cylinder 41 is open at the lower end side and is connected to a housing 45 at the lower end portion. A connecting rod 46 is connected to the piston 42 via a piston pin 46a. A motor 47 is housed in the housing 45. The motor 47 is connected to the connecting rod 46 via pulleys 48 and a belt 49 wound around the pulleys 48.

When the gas compressor 40 is operated, power of the motor 47 is transmitted to the piston 42 by the connecting rod 46 via the belt 49 and pulleys 48. By moving the piston 42 up and down, outside air is sucked into the compression/expansion chamber 43 from the inlet 44a and the sucked-in gas is compressed in the compression/expansion chamber 43. The compressed gas is discharged to the outside of the compression/expansion chamber 43 through the outlet 44b and is collected by the pipe.

Figure 5:
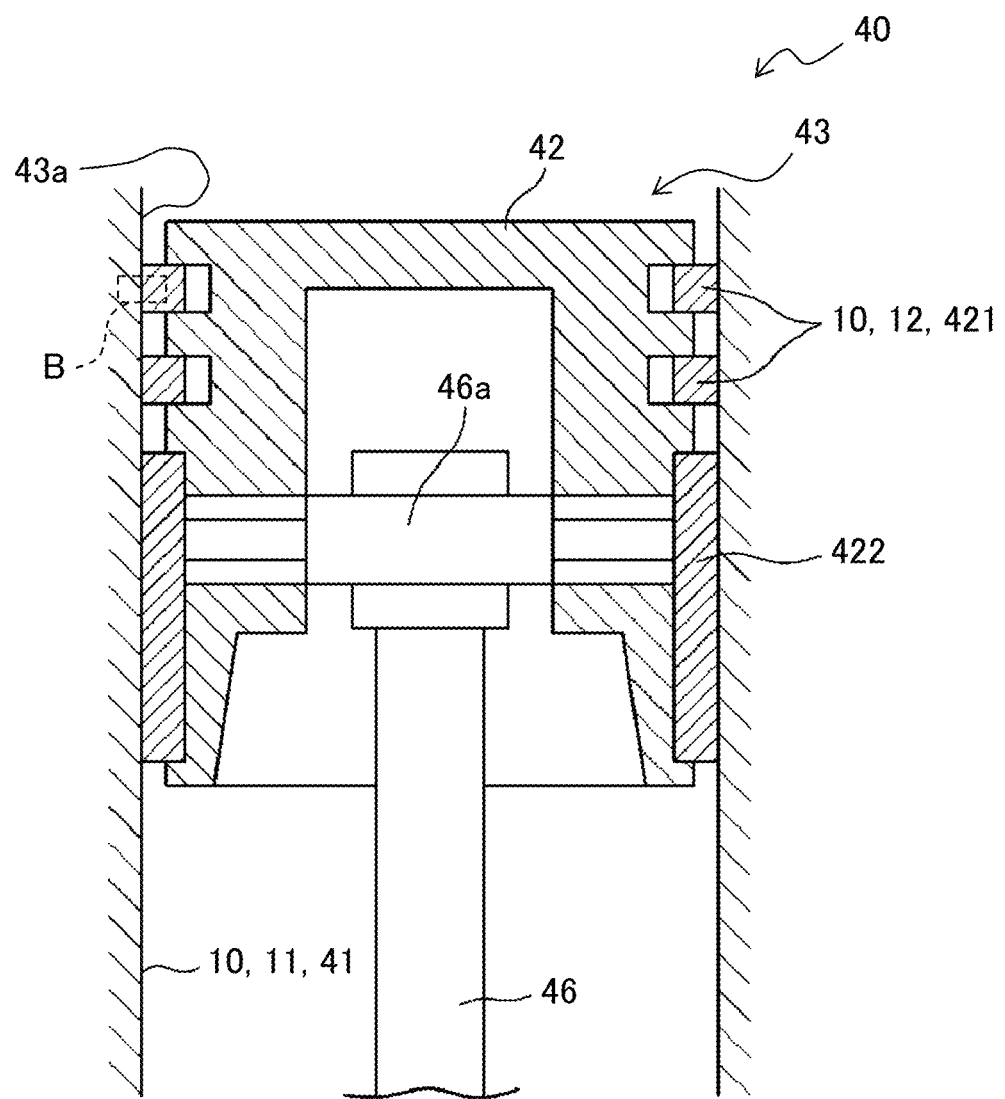
FIG. 5 is an enlarged view of an inside of the cylinder shown in FIG. 4.

FIG. 5 is an enlarged view showing an inside of the cylinder 41 shown in FIG. 4. The cylinder 41 is an example of the member 11 illustrated in FIG. 1. A piston ring 421 is an example of the sliding material 12 shown in FIG. 1. Therefore, the sliding portion 10 includes the cylinder 41 and the piston ring 421. A rider ring 422 may also be formed by the sliding material 12.

The cylinder 41 may be made of metal or resin. For example, the cylinder 41 is made of an aluminium-based material such as aluminium or an aluminium alloy. Aluminium anodizing treatment has been performed on an inner circumferential surface 43a (an example of the sliding surface 13 shown in FIG. 1) of the cylinder 41. Therefore, the inner circumferential surface 43a is a surface of an anodized aluminium layer.

The piston ring 421 and the rider ring 422 are annularly mounted on the piston 42. As the piston 42 moves up and down, the piston ring 421 and the rider ring 422 slide on the inner circumferential surface 43a of the cylinder 41. In this way, contact between the piston 42 and the cylinder 41 and galling may be suppressed. As a result, a smoothly slidable state between the piston 42 and the cylinder 41 may be obtained.

Gas supplied to the compression/expansion chamber 25, 43 of the gas compressor 20, 40 may be, for example, the atmosphere (air) or a dry gas with extremely low water vapor content. The sliding material 12 of the present disclosure is capable of exhibiting sufficient durability against abrasion regardless of the type of gas that is to be compressed. Therefore, the gas compressor 20, 40 that uses the sliding material 12 of the present disclosure may be used for, for example, compression of dry gas. Examples of the dry gas include a gas having a dew point of −30° C. or lower. More specifically, examples include synthetic air, high-purity nitrogen gas, oxygen gas, helium gas, argon gas, and hydrogen gas.

Examples

Hereinafter, the present disclosure will be described in more detail with reference to examples.

Sliding materials of Examples 1-7 and Comparative Examples 1-5 were prepared using materials shown in Table 1 below. As the resin 12a, PTFE was used as an example of a fluorocarbon resin. As the first particles 12b, copper was used as an example of metal, and the average particle size (size) of the first particles 12b was 60 μm. As the second particles 12c, diatomaceous earth, silica, or alumina, each of which is an example of ceramic, was used. The average particle size (size) of diatomaceous earth was 36 μm, the average particle size (size) of silica was 24 μm, and the average particle size (size) of alumina was 50 μm.

TABLE 1

| | First particles 12b | Second particles 12c | Value of present disclosure |
|---|---|---|---|
| Example 1 | Copper | Diatomaceous earth | 0.3 |
| Example 2 | Copper | Diatomaceous earth | 1.1 |
| Example 3 | Copper | Diatomaceous earth | 1.4 |
| Example 4 | Copper | Silica | 1.6 |
| Example 5 | Copper | Diatomaceous earth | 1.8 |
| Example 6 | Copper | Alumina | 2.4 |
| Example 7 | Copper | Diatomaceous earth | 2.8 |
| Comparative Example 1 | Copper | Not used | 0 |
| Comparative Example 2 | Copper | Diatomaceous earth | 0.1 |
| Comparative Example 3 | Copper | Silica | 3.2 |
| Comparative Example 4 | Copper | Diatomaceous earth | 3.5 |
| Comparative Example 5 | Not used | Copper | ∞ |

With regards to individual materials used, the Vickers hardness of copper was 57HV, the Vickers hardness of diatomaceous earth was 600HV, the Vickers hardness of silica was 900HV, and the Vickers hardness of alumina was 1385HV. Therefore, diatomaceous earth, silica, and alumina all had a Vickers hardness that was greater than the Vickers hardness of copper. The hardness ratio of the present disclosure was 11 when the first particles 12b were composed of copper and the second particles 12c were composed of diatomaceous earth. The hardness ratio of the present disclosure was 16 when the first particles 12b were composed of copper and the second particles 12c were composed of silica. The hardness ratio of the present disclosure was 24 when the first particles 12b were composed of copper and the second particles 12c were composed of alumina.

In Examples 1-7 and Comparative Examples 1-4, Copper was used as the first particles 12b. In Comparative Example 5, the first particles 12b were not used. In Examples 1-3, 5, and 7 and Comparative Examples 2 and 4, diatomaceous earth was used as the second particles 12c. In Example 4 and Comparative Examples 3 and 5, silica was used as the second particles 12c. In Example 6, alumina was used as the second particles 12c. In Comparative Example 1, the second particles 12c were not used. Comparative Example 1 corresponds to the technique described in Patent Literature 1.

In Examples 1-7, the values of the present disclosure were greater than or equal to 0.3 and less than or equal to 2.8. In Comparative Examples 1-5, the values of the present disclosure were less than 0.3 or greater than 2.8. In Comparative Example 5, the content ratio of the present disclosure was 0, and the denominator of a fraction when the value of the present disclosure was represented by the fraction became 0. Therefore, the value of the present disclosure was undefined and became infinite. Even in this case, however, the value of the present disclosure was at least larger than 2.8.

Figure 6:
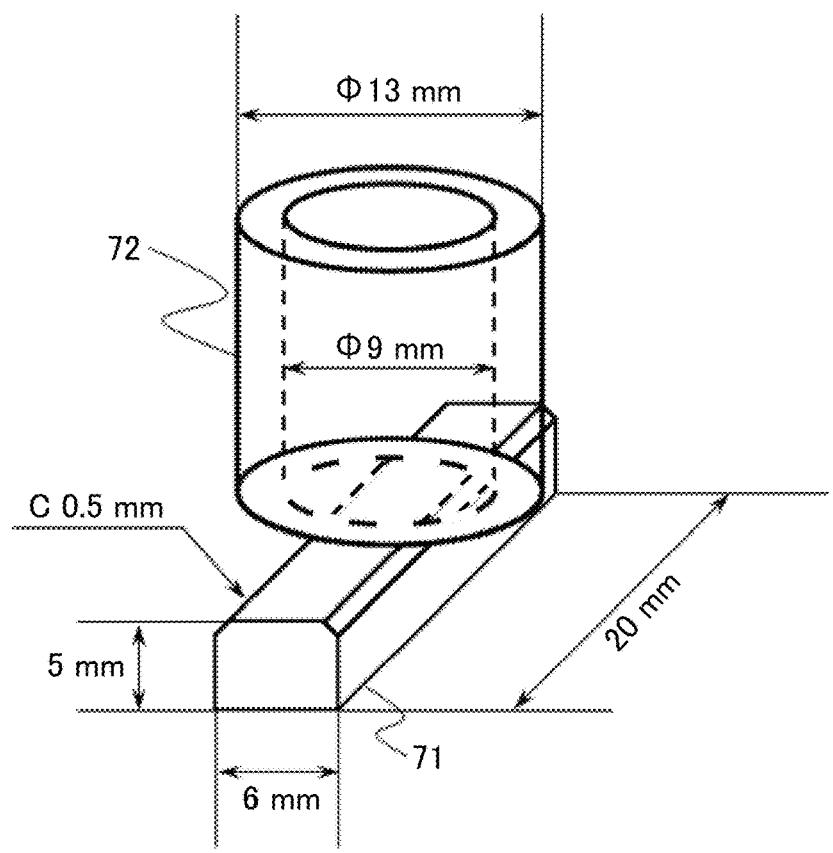
FIG. 6 is a diagram for explaining a test method of a friction test.

FIG. 6 is a diagram illustrating a test method of a friction test. The sliding materials of Examples 1-7 and Comparative Examples 1-5 were each processed into a block-shaped test piece 71. An annular test piece 72 was brought into contact with an upper surface of the test piece 71. The test piece 71 had a substantially rectangular column shape with a width of 6 mm, a length of 20 mm, and a height of 5 mm. The test piece 71 was C-chamfered with a depth of 0.5 mm along two edges opposing each other on an upper portion of the rectangular column. The test piece 72 was made of an aluminium alloy, and a surface thereof was treated with sulfuric acid anodizing. The test piece 72 had a cylindrical shape and had an inner diameter of 9 mm and an outer diameter of 13 mm.

The friction test was performed by rotating the test piece 72 while a test piece 71 remained fixed. The friction test was performed for 15 hours under the following conditions: contact pressure of 1 MPa, speed of 2 m/s, and temperature of 120° C.

Figure 7:
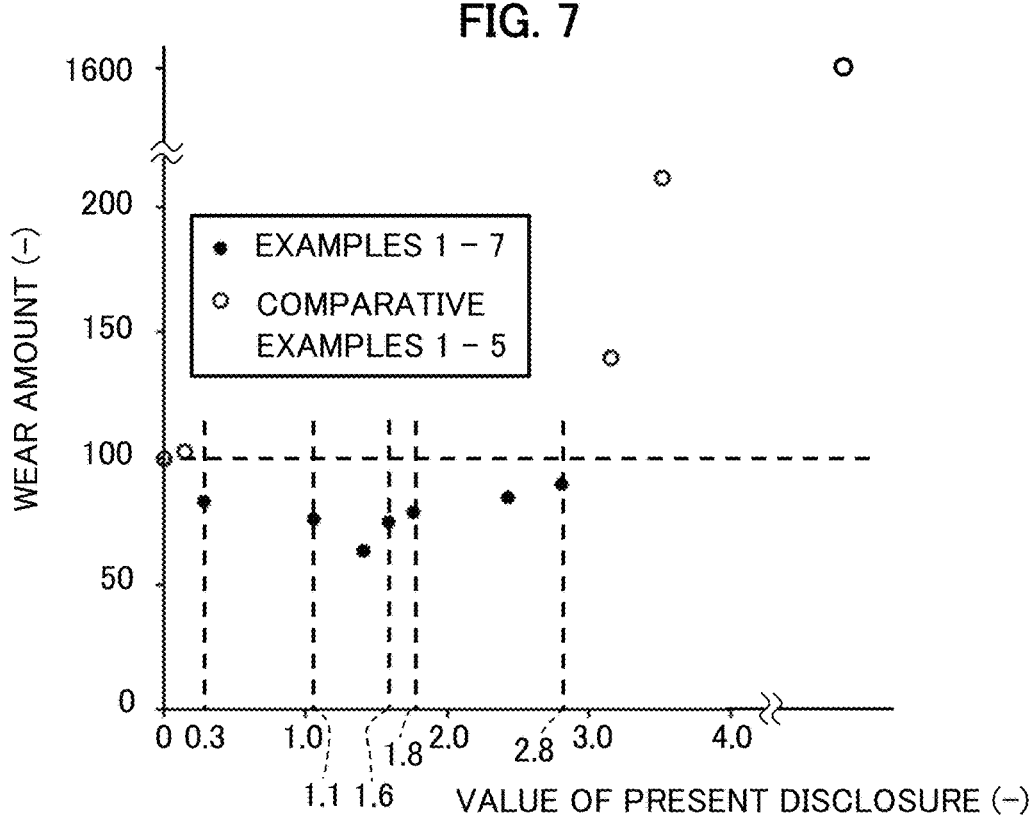
FIG. 7 is a diagram for explaining test results of the friction test.

FIG. 7 is a diagram illustrating test results of the friction test. The vertical axis of the graph of FIG. 7 represents a wear amount of the test piece 71 after the friction test. The wear amount was obtained by dividing an amount of mass reduction from before the friction test to after the friction test by the density of the test piece 71. For ease of understanding of the results, the wear amount is expressed as a relative value when the wear amount of Comparative Example 1 is taken as 100.

For each of Examples 1 to 7 in which values of the present disclosure were greater than or equal to 0.3 and less than or equal to 2.8, the wear amount was less than 100, which is a value corresponding to the technique described in Patent Literature 1. Among the Examples, cases where the value of the present disclosure was greater than or equal to 1.1 and less than or equal to 1.8 (Examples 2-5) resulted in particularly small wear amounts. On the other hand, for each of Comparative Examples 1-5 in which values of the present disclosure were less than 0.3 or greater than 2.8, the wear amount was greater than or equal to 100. In particular, for Comparative Example 5, the wear amount was 1600, which was 16 times that of Comparative Example 1.

From these results, it has been shown that the wear amount may be reduced and the wear resistance may be improved by using the first particles 12b and second particles 12c having different Vickers hardness in combination and setting the value of the present disclosure to be greater than or equal to 0.3 and less than or equal to 2.8. In particular, it has been shown that, by using the first particles 12b and second particles 12c in combination and setting the value of the present disclosure to be greater than or equal to 0.3 and less than or equal to 2.8, the wear amount may be reduced compared to cases where the first or second particles are used on their own (Comparative Examples 1 and 5).

With Comparative Examples 1 and 2, in which the respective values of the present disclosure were less than 0.3, it may be considered that the first particles 12b and second particles 12c easily yielded to shear stress from the outside. Therefore, it may be considered that the durability of the material itself was low, increasing the wear amount compared to Examples 1-7.

In the technique described in Patent Literature 1, which corresponds to Comparative Example 1, PTFE has been used as a base material to which a copper alloy has been added. Copper and copper alloys are soft and therefore cannot support shear stress in a severe environment such as high pressure and may easily yield, causing increased wear. A Copper alloy is classified as the first particles 12b of the present disclosure, and a material corresponding to the second particles 12c has not been used. Therefore, the sliding material described in Patent Literature 1 has a small hardness ratio of the present disclosure and a large content ratio of the present disclosure. Therefore, since the value of the present disclosure is small, it may be considered that the wear amount increases due to the durability of the material itself being insufficient in the severe environment.

Furthermore, with Comparative Examples 3-5, in which values of the present disclosure exceeded 2.8, wear increased due to an abrasive effect. In particular, with Comparative Example 5, in which the first particles 12b were not included, it may be considered that the wear amount became large from strong exertion of abrasive action caused by silica with a high Vickers hardness.

In Comparative Example 5, the first particles 12b which are relatively soft as described above were not used, and the second particles 12c composed of relatively hard silica were used. A hard material such as silica or alumina generates abrasive particles due to the falling off or the like caused by shearing as described above. Thus, the wear amount tends to increase due to cutting action. Therefore, a sliding material that does not use the first particles 12b and uses only the second particles 12c has a large hardness ratio of the present disclosure and a small content ratio of the present disclosure. Therefore, because the value of the present disclosure was large, it may be considered that the wear amount increased by an abrasive effect.

As described above, according to the sliding material 12 of the present disclosure, wear resistance (durability against friction) may be improved. Therefore, by applying the sliding material 12 to, for example, the tip seal 291, 292 (FIG. 3), the piston ring 421 (FIG. 5), or the like, the replacement life thereof may be prolonged. Therefore, the maintenance cycle and the life of the gas compressor 20, 40 may be prolonged.

An object of the present disclosure is to provide a sliding material having good wear resistance and a gas compressor.

According to the present disclosure, a sliding material having good wear resistance and a gas compressor can be provided.

REFERENCE SIGNS LIST

10 Sliding portion
12 Sliding material
12a Resin
12b First particles
12c Second particles
13 Sliding surface 20 Gas compressor
21 Fixed scroll (sliding portion)
21e Wrap bottom face (sliding surface)
22e Wrap bottom face (sliding Surface)
22 Orbiting scroll (sliding portion)
25 Compression/expansion chamber (chamber)
291 Tip seal (sliding material, sliding portion)
292 Tip seal (sliding material, sliding portion)
40 Gas compressor
41 Cylinder (sliding portion)
421 Piston ring (sliding material, sliding portion)
43 Compression/expansion chamber (chamber)
43a Inner circumferential surface (sliding surface)

The invention claimed is:

1. A sliding material comprising:
a resin comprising a fluorocarbon polymer;
a plurality of first particles disposed in the resin and composed of an inorganic material comprising a first Vickers hardness, each first particle of the plurality of first particles comprising a surface; and
a plurality of second particles disposed in the resin and composed of an inorganic material comprising a second Vickers hardness,
wherein the second Vickers hardness is greater the first Vickers hardness,
wherein the sliding material comprises a hardness ratio, a content ratio, and a target value,
wherein the hardness ratio comprises dividing the second Vickers hardness by the first Vickers hardness,
wherein the content ratio comprises a first contained amount of the plurality of first particles in the resin divided by a second contained amount of the second particles in the resin,
wherein the target value comprises dividing the hardness ratio by the content ratio, the target value being greater than or equal to 0.3 and less than or equal to 2.8,
wherein the plurality of first particles comprise one or more of at least one of copper, an alloy whose main component is copper, aluminium, and an alloy whose main component is aluminium,
wherein each first particle of the plurality of first particles comprises an adhesion layer improving a joining strength between the resin and the plurality of first particles, and
wherein the second particles include at least one of alumina, silica, zinc oxide, or silicon carbide.

2. The sliding material according to claim 1, wherein the first Vickers hardness is greater than or equal to 50HV and less than or equal to 200HV.

3. The sliding material according to claim 1, further comprising:
fiber disposed in the resin.

4. The sliding material according to claim 3, wherein the fiber is carbon fiber.

5. The sliding material according to claim 1, further comprising:
a solid lubricant disposed in the resin.

6. The sliding material according to claim 5, wherein the solid lubricant is molybdenum disulfide.

7. The sliding material according to claim 1, wherein a chemical treatment layer is formed between the resin and the first particles.

8. A gas compressor comprising:
a chamber configured to perform at least one of compression or expansion of a gas; and
a sliding portion including a sliding material that slides on a sliding surface that defines the chamber, wherein the sliding material includes:
a resin comprising a fluorocarbon polymer;
a plurality of first particles disposed in the resin and composed of an inorganic material comprising a first Vickers hardness, each first particle of the plurality of first particles comprising a surface; and
a plurality of second particles disposed in the resin and composed of an inorganic material comprising a second Vickers hardness,
wherein the second Vickers hardness is greater the first Vickers hardness,
wherein the sliding material comprises a hardness ratio, a content ratio, and a target value,
wherein the hardness ratio comprises dividing the second Vickers hardness by the first Vickers hardness,
wherein the content ratio comprises a first contained amount of the plurality of first particles in the resin divided by a second contained amount of the second particles in the resin,
wherein the target value comprises dividing the hardness ratio by the content ratio, the target value being greater than or equal to 0.3 and less than or equal to 2.8,
wherein the plurality of first particles comprise one or more of at least one of copper, an alloy whose main component is copper, aluminium, and an alloy whose main component is aluminium,
wherein each first particle of the plurality of first particles comprises an adhesion layer improving a joining strength between the resin and the plurality of first particles, and
wherein the second particles include at least one of alumina, silica, zinc oxide, or silicon carbide.

9. The gas compressor according to claim 8, wherein the sliding surface is a surface of an anodized aluminium layer.

10. The gas compressor according to claim 8, wherein the sliding material slides on the sliding surface oil free.

11. The sliding material according to claim 1, wherein the target value comprises dividing the hardness ratio by the content ratio, the target value being greater than or equal to 1.1 and less than or equal to 2.

12. The sliding material according to claim 1, wherein the target value comprises dividing the hardness ratio by the content ratio, the target value being greater than or equal to 0.3 and less than or equal to 1.8.

13. The sliding material according to claim 1, wherein the adhesion layer is formed by a titanium-based coupling agent or a silicon-based coupling agent or a plating treatment.

14. The sliding material according to claim 1, wherein the adhesion layer is formed by a nickel plating or iron plating.

* * * * *